United States Patent
Matsuo et al.

[11] Patent Number: 5,869,927
[45] Date of Patent: *Feb. 9, 1999

[54] FLUORESCENT LAMP WITH A MIXED LAYER CONTAINING PHOSPHOR AND METAL OXIDE

[75] Inventors: Kazuhiro Matsuo, Katano; Yasuhiro Ikai, Kusatsu; Juichi Sasada, Kyoto, all of Japan

[73] Assignee: Matsushita Electronics Corporation, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 600,101

[22] Filed: Feb. 8, 1996

[30] Foreign Application Priority Data

Jul. 31, 1995 [JP] Japan .................................... 7-194546
Feb. 5, 1996 [JP] Japan .................................... 8-019186

[51] Int. Cl.$^6$ ...................................................... H01J 61/44
[52] U.S. Cl. ........................... 313/485; 313/486; 313/487; 313/635
[58] Field of Search ..................... 313/485, 486, 313/487, 489, 490, 635

[56] References Cited

U.S. PATENT DOCUMENTS

| | | | |
|---|---|---|---|
| 4,670,688 | 6/1987 | Sigai et al. | 313/489 |
| 5,051,653 | 9/1991 | DeBoer et al. | 313/489 |
| 5,087,523 | 2/1992 | Sigai et al. | 313/486 |
| 5,604,396 | 2/1997 | Watanabe et al. | 313/485 |
| 5,614,783 | 3/1997 | Fujino | 313/485 |

FOREIGN PATENT DOCUMENTS

| | | |
|---|---|---|
| 4-245162 | 9/1992 | Japan . |
| 7-54692 | 6/1995 | Japan . |
| 7-230788 | 8/1995 | Japan . |
| 7-254390 | 10/1995 | Japan . |

*Primary Examiner*—Sandra L. O'Shea
*Assistant Examiner*—Vip Patel
*Attorney, Agent, or Firm*—Panitch Schwarze Jacobs & Nadel, P.C.

[57] ABSTRACT

A highly safe fluorescent lamp is disclosed, in a mixed layer having couplings of phosphors and a metal oxide such as yttrium oxide is formed on the inner surface of a glass bulb. The couplings of the mixed layer strongly couples the grains arranged in crosslinked state between the phosphor grains of the phosphor material. A first thin film of the metal oxide is formed between the glass bulb and the mixed layer. A second thin film of the same metal oxide is formed on the inner surface of the mixed layer nearer to the bulb center. The amount of mercury sealed in the glass bulb thus is reduced, thereby minimizing the mercury consumption which has so far been the problem against environmental protection.

9 Claims, 12 Drawing Sheets

F I G. 14
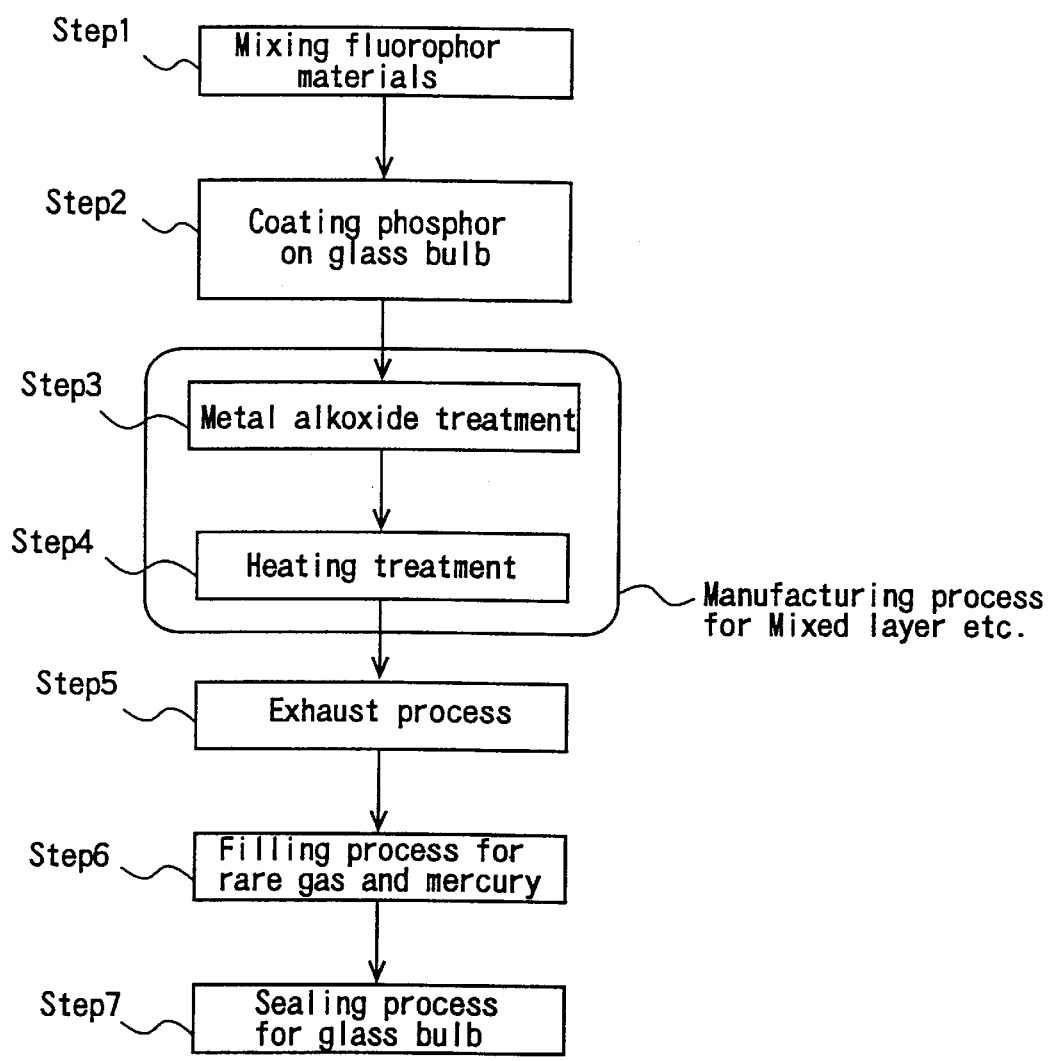

FLUORESCENT LAMP WITH A MIXED LAYER CONTAINING PHOSPHOR AND METAL OXIDE

FIELD OF THE INVENTION AND RELATED ART STATEMENT

1. Field of the Invention

The present invention relates to a fluorescent lamp using the discharge of low-pressure mercury vapor and a method for manufacturing the same.

2. Description of the Related Art

Generally, a fluorescent lamp has mercury sealed in a lamp casing made of a glass bulb or the like and uses light of 254 nm in the excitation wavelength of mercury in order to illuminate the phosphor deposited on the inner surface of the lamp casing.

In recent years, from the viewpoint of environmental protection, demand is rising for reducing the amount of mercury used in the fluorescent lamp, and development of techniques is sought to suppress the mercury consumption in the lamp casing.

Mercury used in conventional fluorescent lamps is diffused in the glass bulb, sodium (Na) diffused from the glass bulb generates amalgam by reaction with mercury, or mercury is adsorbed to the phosphor. In this way, mercury is consumed gradually with the lapse of time.

In order to prevent mercury from diffusing in the glass bulb or from reacting with sodium ions emanating from the glass bulb, the conventional fluorescent lamp has an alumina protective layer formed on the inner surface of the glass bulb.

The present inventors measured the ion count of mercury for the conventional fluorescent lamp using the secondary ion mass spectrometer (SIMS) in order to examine the mercury consumption in the conventional fluorescent lamp. FIG. 15 is a graph showing the result of analysis conducted on the secondary ion count of mercury in the phosphor layer, the alumina protective layer and the glass bulb of an ordinary conventional three band fluorescent lamp. As shown in FIG. 15, in the conventional fluorescent lamp, a considerable amount of mercury is consumed by being adsorbed to the phosphor layer.

As described above, with the conventional fluorescent lamp, a considerable amount of mercury is consumed by adsorption to the phosphor layer, although reaction between the mercury sealed in the lamp casing and the sodium ions in the glass bulb is suppressed. In addition, the mercury consumption increases with the lapse of time when the fluorescent lamp is used.

As a result, in the lamp casing of the conventional fluorescent lamp, the mercury, which is hazardous to the earth environment and should desirably be consumed as little as possible, is consumed in a great amount considerably exceeding the minimum requirement for illumination.

A conventional technique for preventing adsorption of mercury to the surface of the phosphor layer is disclosed in gazette of the Japanese unexamined patent application (TOKKAI) Hei 4-245162. The object of the prior art disclosed in this patent publication is to prevent reduction in luminous fluxes by suppressing the phenomenon called the blackening in which the lamp casing is blackened by the mercury of the fluorescent lamp. The fluorescent lamp disclosed in this publication, in order to achieve the above-mentioned object, is intended to form a film on the inner surface of the phosphor layer whereby the adsorption of mercury to the phosphor layer is reduced thereby to suppress the blackening.

With the conventional fluorescent lamp configured as described above (4-245162), the film formed on the inner surface of the phosphor layer has spaces like sand, thereby making it difficult to completely prevent intrusion of mercury into the phosphor layer or the like. For this reason, the prior art cannot reduce the amount of mercury to be sealed in the lamp casing by remarkably reducing the mercury consumption by the fluorescent lamp.

OBJECT AND SUMMARY OF THE INVENTION

The object of the present invention is to provide a fluorescent lamp and a method for manufacturing the same, in which adsorption of mercury to the phosphor layer or the like and reaction between mercury and sodium in the glass bulb are prevented, thereby making it possible to set the amount of mercury to be sealed in advance to a minimum required for illumination.

With a fluorescent lamp in accordance with the present invention, a mixed layer including phosphors and metal oxide couplings is formed on the inner surface of the lamp casing, mercury is sealed in the lamp casing, the couplings in the mixed layer are arranged in the spaces between the phosphor grains, and the couplings connect the phosphor grains in a crosslinking state.

According to a fluorescent lamp of the present invention, a mixed layer including couplings and phosphor is formed on the inner surface of the lamp casing, thereby preventing adsorption of mercury to the phosphor. At the same time the amount of mercury to be sealed in the fluorescent lamp can be reduced to a minimum required for illumination. Consequently, according to the present invention, the amount of mercury, which has posed the problem of environmental protection, can be considerably reduced, thereby providing a highly safe fluorescent lamp.

In the fluorescent lamp in accordance with the present invention, a first thin film is further formed between the lamp casing and the mixed layer, and a second thin film is formed on the inner surface of the mixed layer nearer to a bulb center of the lamp casing. As a result, the mercury sealed in the lamp casing is positively isolated from the lamp casing and phosphor. Diffusion and adsorption of mercury to the lamp casing and the phosphor thus is prevented, and therefore the mercury consumption is remarkably reduced. According to the present invention, therefore, it is possible to eliminate the wasteful consumption of mercury and reduce the amount of mercury which has posed the pollution.

In a fluorescent lamp in accordance with the present invention, a mixed layer including phosphors and metal oxide couplings is formed on an inner surface of a lamp casing, a first thin film is formed between the lamp casing and the mixed layer, and a second thin film is formed on the inner surface of the mixed layer near to a bulb center of the lamp casing. According to the present invention, therefore it is possible to eliminate the wasteful consumption of mercury and considerably reduce the amount of mercury used in the lamp casing.

In a method for manufacturing a fluorescent lamp according to the present invention, a phosphor material is coated on the inner surface of the lamp casing and dried to form a phosphor layer. This phosphor layer is coated with a metal alkoxide solution and subjected to hydrolysis. As the next step, the phosphor layer is heat treated thereby to form a mixed layer having a coupling of a metal oxide in crosslinking state between the phosphor grains of the phosphor layer.

Further, a method for manufacturing a fluorescent lamp according to the present invention uses a metal alkoxide or the like for producing a protective film, and the polymerization reaction of the metal alkoxide is performed on the phosphor layer. A strong mixed layer can thus be produced. Also, a chemically stable mixed layer can be formed by this method.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 14 is a flowchart for explaining a method for manufacturing a fluorescent lamp according to the present invention.

DESCRIPTION OF THE PREFERRED EMBODIMENTS

Preferred embodiments of the fluorescent lamp according to the present invention are described below with reference to the accompanying drawings.

Figure 1:
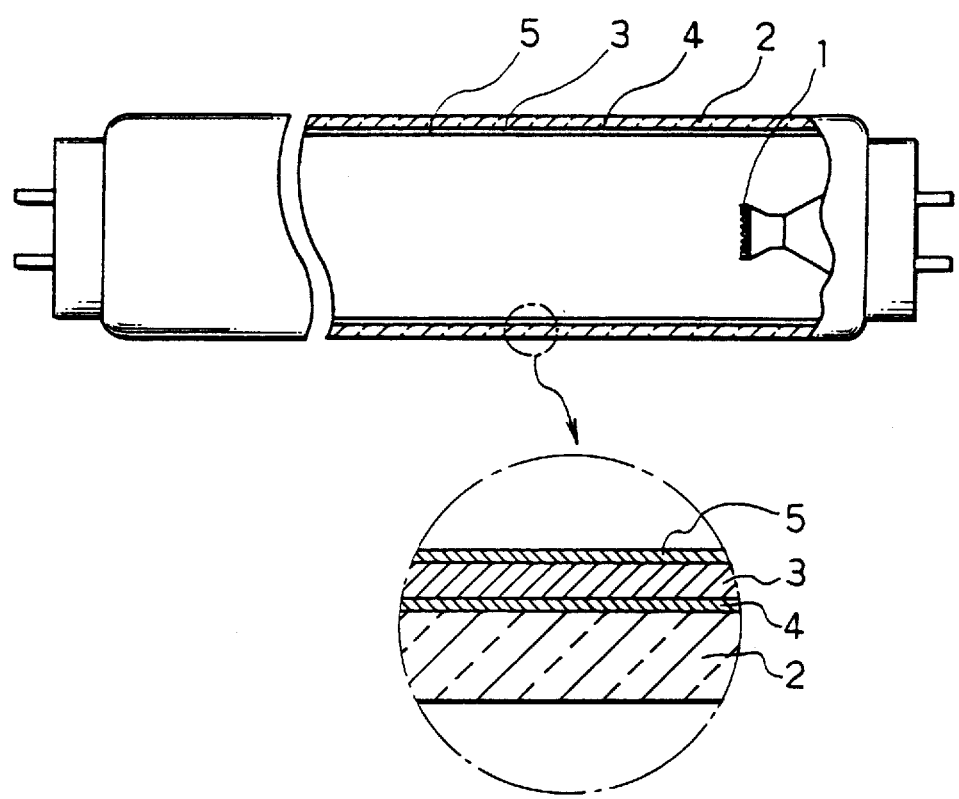
FIG. 1 is a side sectional view and a partially enlarged sectional view showing a broken-out section of a fluorescent lamp according to an embodiment of the present invention.

FIG. 1 is a side sectional view showing a partially broken-out section of a fluorescent lamp according to a preferred embodiment of the present invention, in which part of the section is shown in an enlarged view. Each layer in the enlarged view is idealized and plotted in flat state.

As shown in FIG. 1, the fluorescent lamp according to this embodiment comprises a glass bulb 2 in linear form constituting a lamp casing and an electrode 1 provided on each of the two ends of the glass bulb 2. A mixed layer 3 having a phosphor material is formed on the inner surface of the glass bulb 2. Also, mercury is sealed together with a rare gas in the glass bulb 2.

The fluorescent lamp according to this embodiment is not for a high-load but a low-load linear or annular fluorescent lamp with a load equivalent to 0.35 W/cm.

Figure 2:
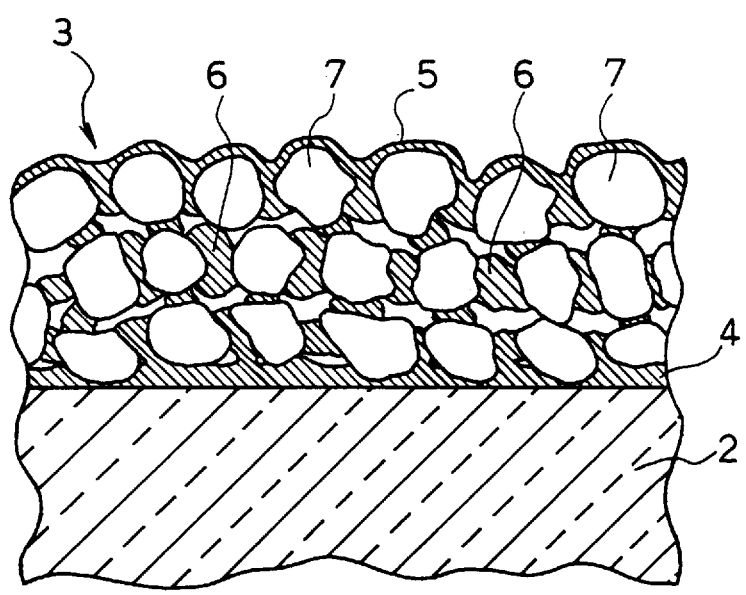
FIG. 2 is an enlarged sectional view of a mixed layer and the like of a fluorescent lamp according to the present invention.

FIG. 2 is a sectional view showing enlarged the mixed layer 3 or the like having a phosphor material in a fluorescent lamp according to this embodiment. As shown in FIG. 2, the mixed layer 3 has formed thereon couplings 6 including a chemically stable vitrified metal oxide, or a yttrium oxide according to the embodiment, in such a manner as to fill the spaces between phosphor grains 7. A first thin film 4 including a yttrium oxide providing the same metal oxide as the couplings 6 is formed between the glass bulb 2 and the mixed layer 3 in such a manner as to cover the inner surface of the glass bulb 2. Further, the inner surface (the upper surface in FIG. 2) of the mixed layer 3 is covered with a second thin film 5 made of yttrium oxide providing the same metal oxide as the couplings 6. The vitrified metal oxide is formed of yttrium oxide and therefore transmits light of 254 nm in the excitation wavelength of mercury. The phosphor grains 7 in the mixed layer 3 thus are illuminated under the light of 254 nm in the excitation wavelength of mercury.

The existence of the couplings 6 in the mixed layer 3, the first thin film 4 and the second thin film 5 of the fluorescent lamp according to the embodiment was confirmed by the inventors using analysis equipment such as SEM (scanning electron microscope) and XMA (X-ray microanalyzer).

Apart from this embodiment using yttrium oxide as a metal oxide, a similar effect was obtained using silicon dioxide, aluminum oxide, hafnium oxide, zirconium oxide, vanadium oxide or niobium oxide.

Now, the light transmittance of a metal oxide used for the first thin film 4, the second thin film 5 and the couplings 6 will be explained with reference to the embodiment under consideration. FIGS. 3 to 9 show a graph representing the transmittance of ultraviolet light in a film (about 0.5 $\mu$m thick) of various metal oxides.

Figure 3:
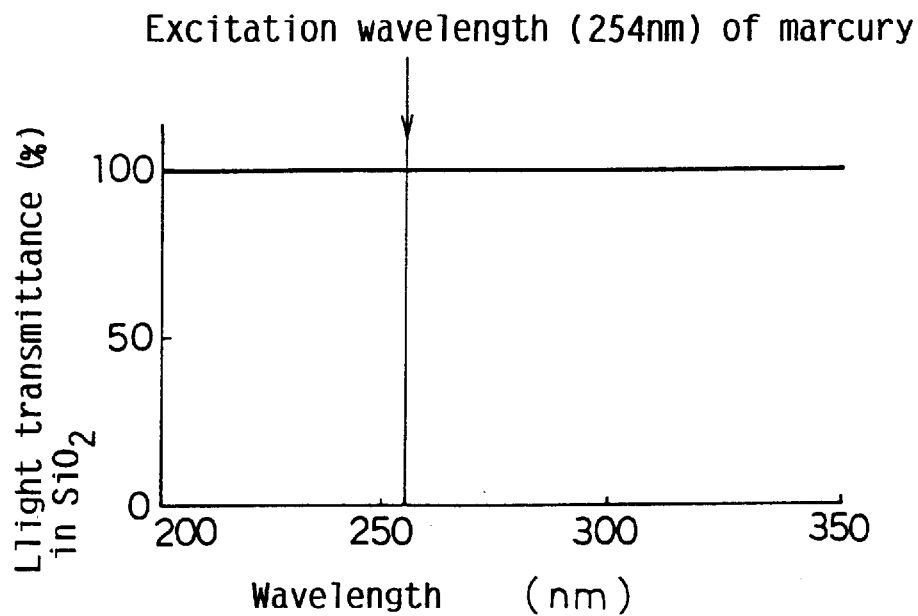
FIG. 3 is a diagram showing the transmittance of light through a silicon dioxide film.
Figure 4:
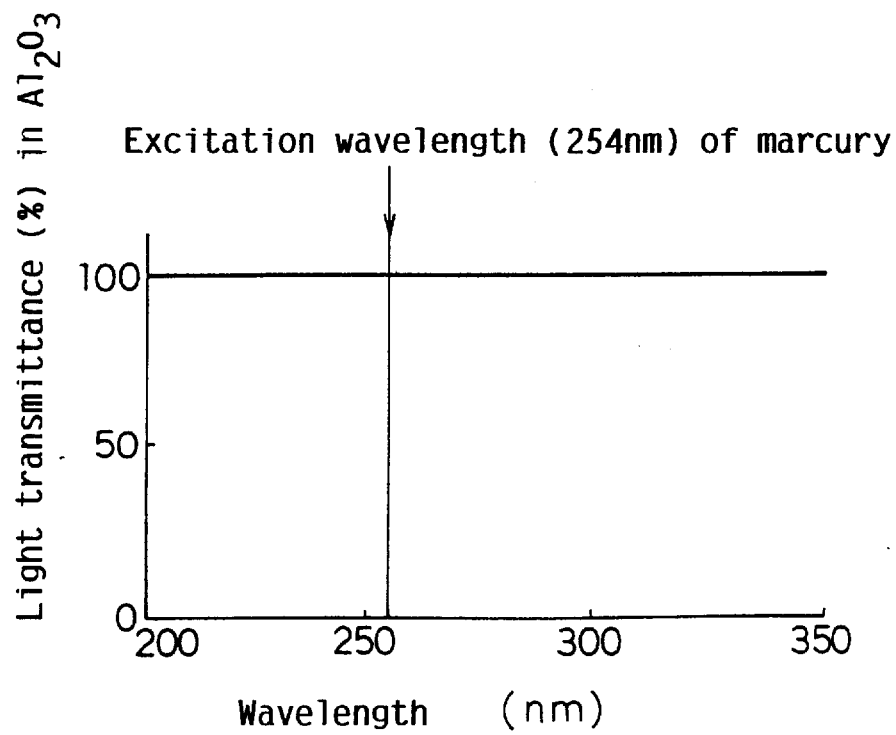
FIG. 4 is a diagram showing the transmittance of light through an aluminum oxide film.
Figure 5:
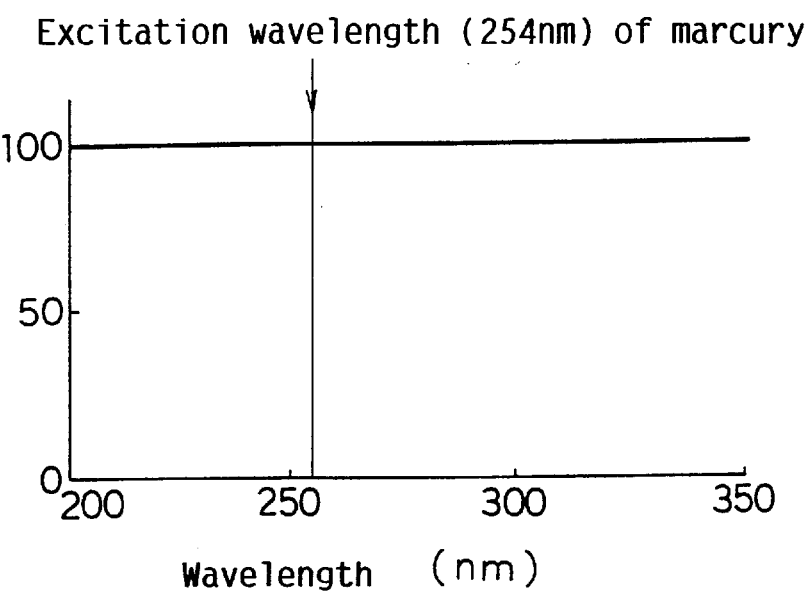
FIG. 5 is a diagram showing the transmittance of light through a hafnium oxide film.

FIG. 3 shows the transmittance for silicon dioxide ($SiO_2$), FIG. 4 the transmittance for aluminum oxide ($Al_2O_3$) and FIG. 5 the transmittance for hafnium oxide ($HfO_2$). As shown in FIGS. 3 to 5, the film of these metal oxides allows substantially full transmission of the light 254 nm in the excitation wavelength of mercury. For this reason, the first thin film 4, the second thin film 5 and the couplings 6 formed of silicon dioxide, aluminum oxide or hafnium oxide has no adverse effect on the illumination of the phosphor grains 7.

Figure 6:
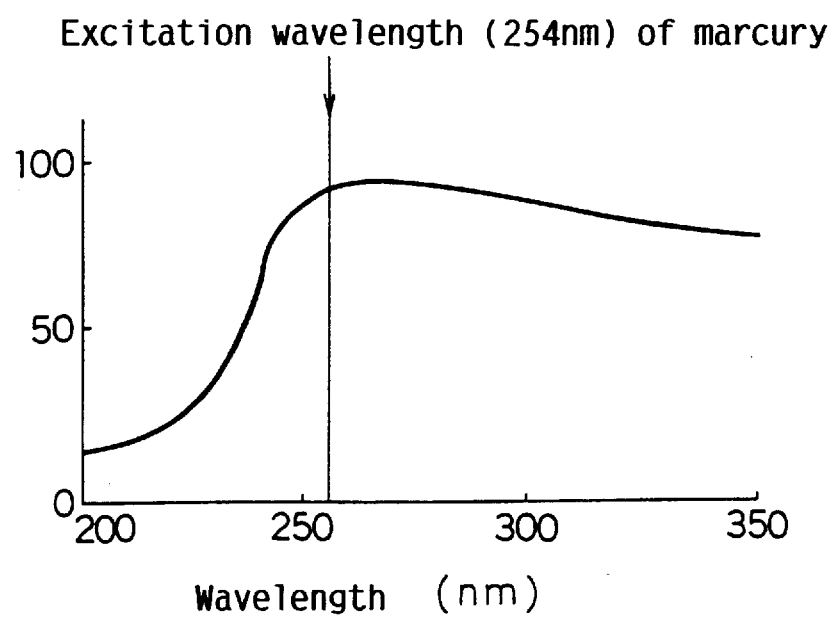
FIG. 6 is a diagram showing the transmittance of light through a zirconium oxide film.
Figure 7:
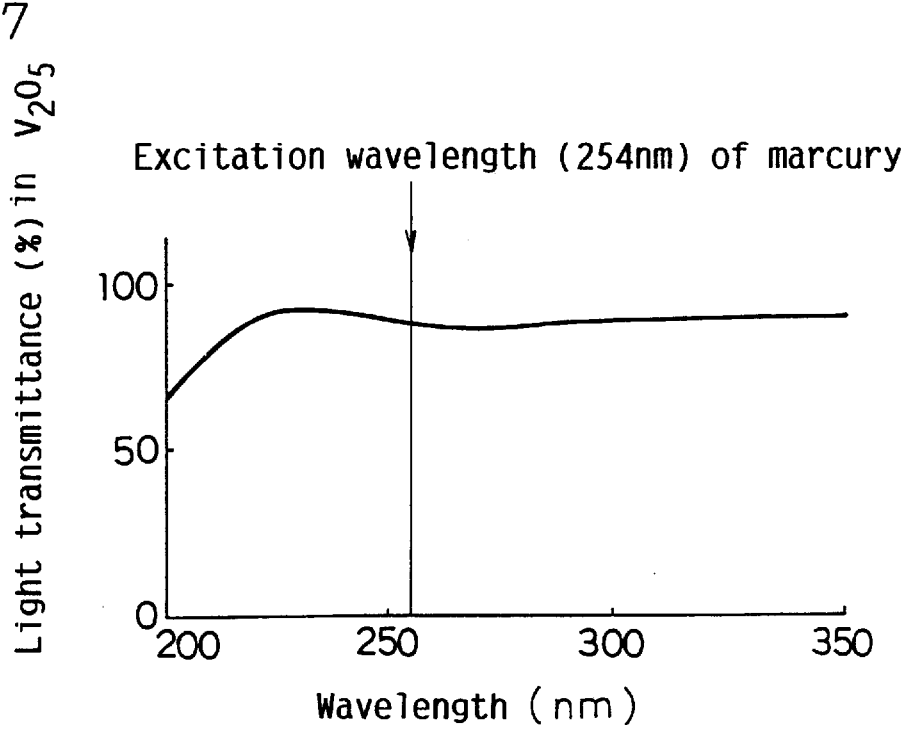
FIG. 7 is a diagram showing the transmittance of light through a vanadium oxide film.
Figure 8:
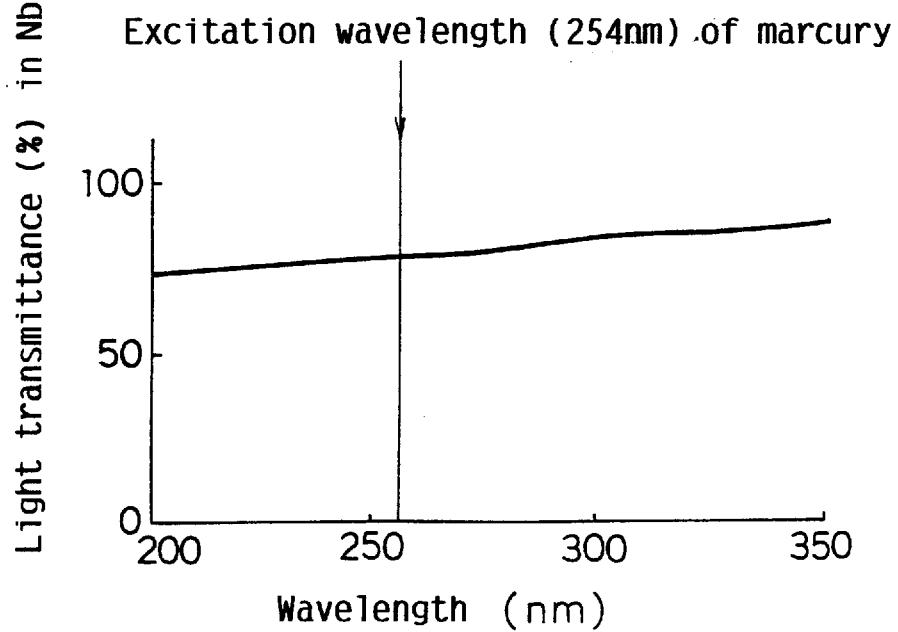
FIG. 8 is a diagram showing the transmittance of light through a niobium oxide film.
Figure 9:
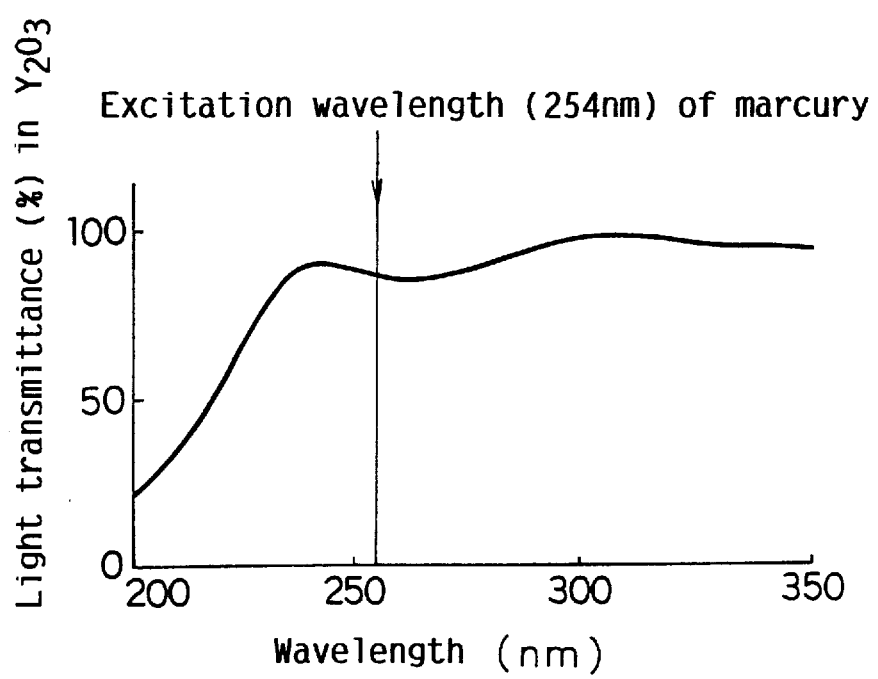
FIG. 9 is a diagram showing the transmittance of light through a yttrium oxide film.

FIG. 6 shows the transmittance for zirconium oxide ($ZrO_2$), FIG. 7 the transmittance for vanadium oxide ($V_2O_5$), FIG. 8 the transmittance for niobium oxide ($Nb_2O_5$), and FIG. 9 the transmittance for yttrium oxide ($Y_2O_3$).

It is seen from FIG. 6 that about 95% of light having the excitation wavelength of mercury of 254 nm is transmitted through zirconium oxide. The first thin film 4, the second thin film 5 and the couplings 6 made of zirconium oxide, therefore, have no adverse effect on the illumination of the phosphor grains 7. The zirconium oxide film is low in transmittance against the light of 200 nm or less in wavelength and cuts off at least 80% of such light.

As shown in FIGS. 7 to 9, vanadium oxide, niobium oxide and yttrium oxide allow transmission of about 85% of light having the excitation wavelength of mercury of 254 nm. The illumination of the phosphor grains 7 therefore is not adversely affected by the first thin film 4, the second thin film 5 and the couplings 6 made of vanadium oxide, niobium oxide or yttrium oxide. The film made of yttrium oxide has a low transmittance against the light of 200 nm or less in wavelength and has the function of cutting off at least 70% of such light.

Figure 10:
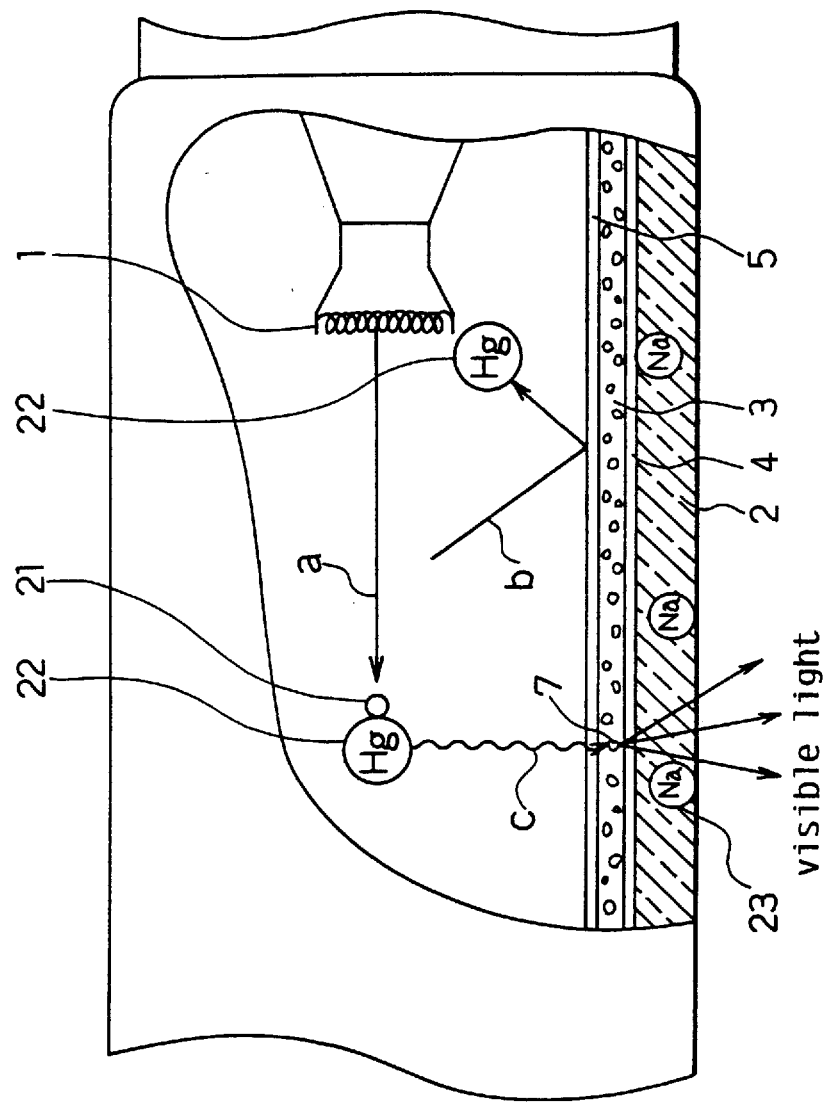
FIG. 10 is a schematic diagram showing a partially broken-out section of a fluorescent lamp according to the present invention.

Now, how the deposition of mercury on the phosphor is prevented in the fluorescent lamp according to the embodiment under consideration will be explained with reference to FIG. 10. FIG. 10 is a schematic diagram showing a partially broken-out section of a fluorescent lamp according to this embodiment.

In FIG. 10, electrons 21 emitted from electrode 1 (the motion of the electrons 21 is indicated by arrow a) excite mercury atoms 22. The ultraviolet light c having the excitation wavelength of 254 nm from the mercury atoms 22 thus excited (the motion of the mercury atoms 22 is indicated by arrow b) is transmitted through the second thin film 5 and the couplings 6 and bombards with the phosphor grains 7. These phosphor grains 7 emit visible light of long wavelength due to the light of 254 nm in excitation wavelength from the mercury atoms 22 according to Stokes' theorem, so that the fluorescent lamp turns on.

In the case where the first thin film 4, the second thin film 5 and the couplings 6 according to this embodiment are formed of yttrium oxide or zirconium oxide, the light having the excitation wavelength of mercury of about 185 nm is substantially cut off. With the fluorescent lamp having the first thin film 4, the second thin film 5 and the couplings 6 made of zirconium oxide or yttrium oxide, light having the wavelength of 185 nm which specifically deteriorates the phosphor grains 7 thus is cut off by a metal oxide, and therefore deterioration of the phosphor grains 7 is considerably suppressed.

The inner surface of the mixed layer 3 according to the present invention is covered with the vitrified flat second thin film 5 formed in such a manner as to cover the phosphor grains 7. Hence, even when the mercury atoms 22 are subjected to Brownian motion, the phosphor grains 7 in the mixed layer 3 are not bombarded. Therefore, the mercury atoms 22 are prevented from being adsorbed to the phosphor grains 7 and forming a mercury oxide.

Further, according to this embodiment, in which the first thin film 4 is formed between the mixed layer 3 and the glass bulb 2, the mercury atoms 22 are unlikely to reach the glass bulb 2. As a result, the sodium atoms 23 contained in the glass bulb 2 are prevented from reacting with the mercury atoms 22 to generate amalgam.

As described above, in a fluorescent lamp according to this embodiment, the mercury atoms 22 are not oxidized by being adsorbed to the phosphor grains 7, nor do they react with the sodium atoms 23 of the glass bulb 2. For this reason, the mercury consumption in the lamp casing can be considerably reduced, and the amount of mercury sealed in the fluorescent lamp can be controlled to a minimum required for illumination.

Now, how mercury intrudes into the metal oxide material used for the first thin film 4, the second thin film 5 and the couplings 6 is described with reference to FIG. 11.

Figure 11:
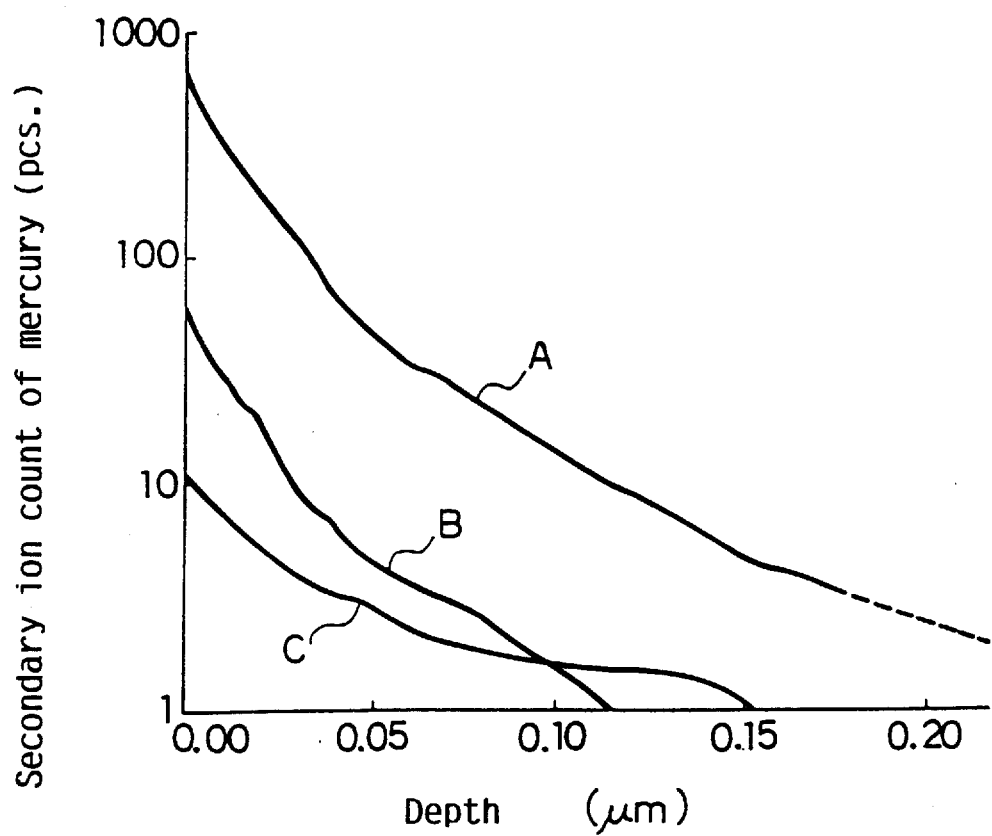
FIG. 11 is a diagram showing the relationship between mercury diffusion and the depth of the yttrium oxide film, the aluminum oxide film and the like, FIG. 12 is a diagram showing the relationship between total luminous flux retention and turn-on time of a fluorescent lamp according to the present invention and a conventional fluorescent lamp.

FIG. 11 is a graph showing the amount of mercury diffusion into various materials along the depth thereof. In FIG. 11, mercury ions were counted using SIMS (secondary ion mass spectrometer) as the amount of mercury diffusion.

The lamps used for this measurement included (a) a lamp simply with a clear bulb of soda glass, (b) a lamp fabricated by depositing an aluminium oxide film 0.5 $\mu$m thick on the inner surface of the same clear bulb, and (c) a lamp fabricated by depositing a yttrium oxide film about 0.5 $\mu$m thick on the inner surface of the same clear bulb. After keeping on these lamps for 2000 hours, the amount of mercury diffusion along the depth was analyzed for each lamp. The result is shown in FIG. 11.

In FIG. 11, curve A represents mercury diffusion for a clear bulb including only soda glass, and curve B mercury diffusion into the aluminum oxide film on the clear bulb. Curve C, on the other hand, indicates mercury diffusion into the yttrium oxide film on the clear bulb.

In FIG. 11, the abscissa represents depth ($\mu$m) in normal decimal scale and the ordinate the secondary ion count of mercury ions (number of ions) in logarithmic scale.

As seen from FIG. 11, the lamp formed with the metal oxide film has a very small amount of mercury intrusion and has the effect of preventing adsorption of mercury to the phosphor grains. Experiments have thus confirmed that a fluorescent lamp having the film of the metal oxide according to this embodiment reduces mercury consumption.

Now, the amount of mercury to be sealed in the fluorescent lamp according to this embodiment will be explained.

A fluorescent lamp (linear type of 20 W; FL20SS·EX-N/18) using yttrium oxide as a metal oxide film according to the embodiment will be described below with reference to FIG. 12.

Figure 12:
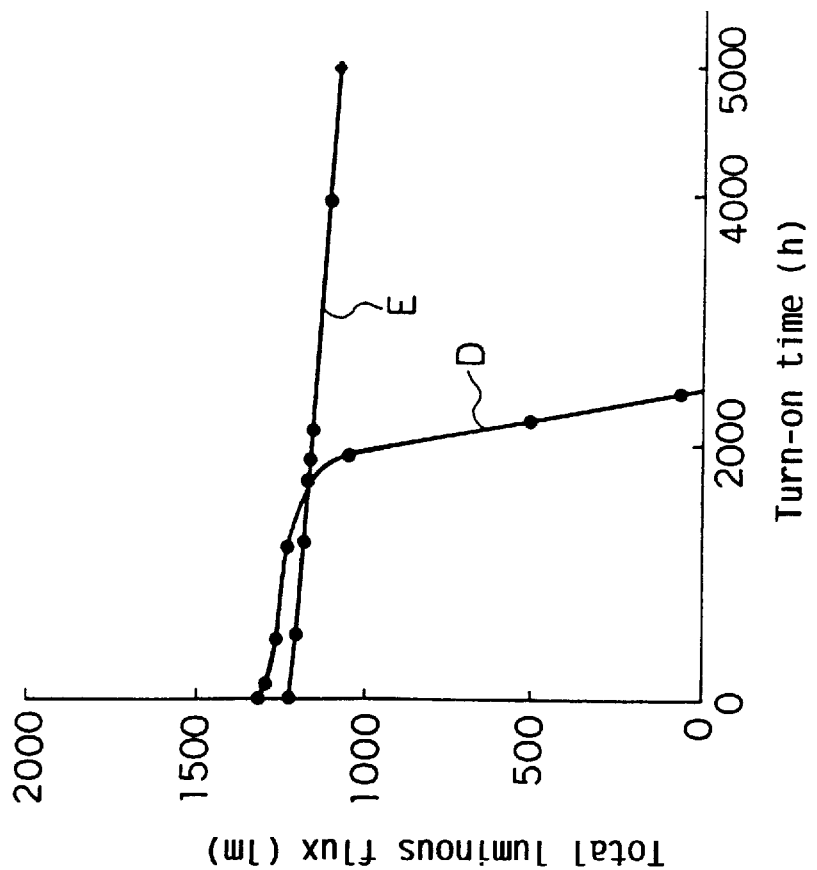

FIG. 12 is a graph analyzing the relationship between total luminous fluxes and turn-on time for a fluorescent lamp having only a phosphor layer and a fluorescent lamp using yttrium oxide as a metal oxide.

The amount of mercury used for the conventional 20 W fluorescent lamp of linear bulb type is about 10 mg. With a 20 W fluorescent lamp of linear bulb type according to this embodiment used for the analysis, however, mercury was limited to a very small amount of 0.5 mg.

In FIG. 12, curve D represents a luminous flux change of a reference fluorescent lamp simply with a phosphor layer, and curve E a luminous flux change of a fluorescent lamp having a yttrium oxide as a metal oxide according to the embodiment.

As is obvious from the graph of FIG. 12, with the fluorescent lamp simply with the phosphor layer (curve D), mercury disappears with the lamp turned off in about 2000 hours. For the fluorescent lamp having a yttrium oxide as a metal oxide (curve E), in contrast, about 90% of luminous fluxes were retained after the lapse of 5000 hours.

The graph of FIG. 12 indicates that the fluorescent lamp according to this embodiment, which comprises the mixed layer 3 having a metal oxide, the first thin film 4 and the second thin film 5 made of the metal oxide, produces the effect of considerably reducing the amount of mercury used.

Figure 13:
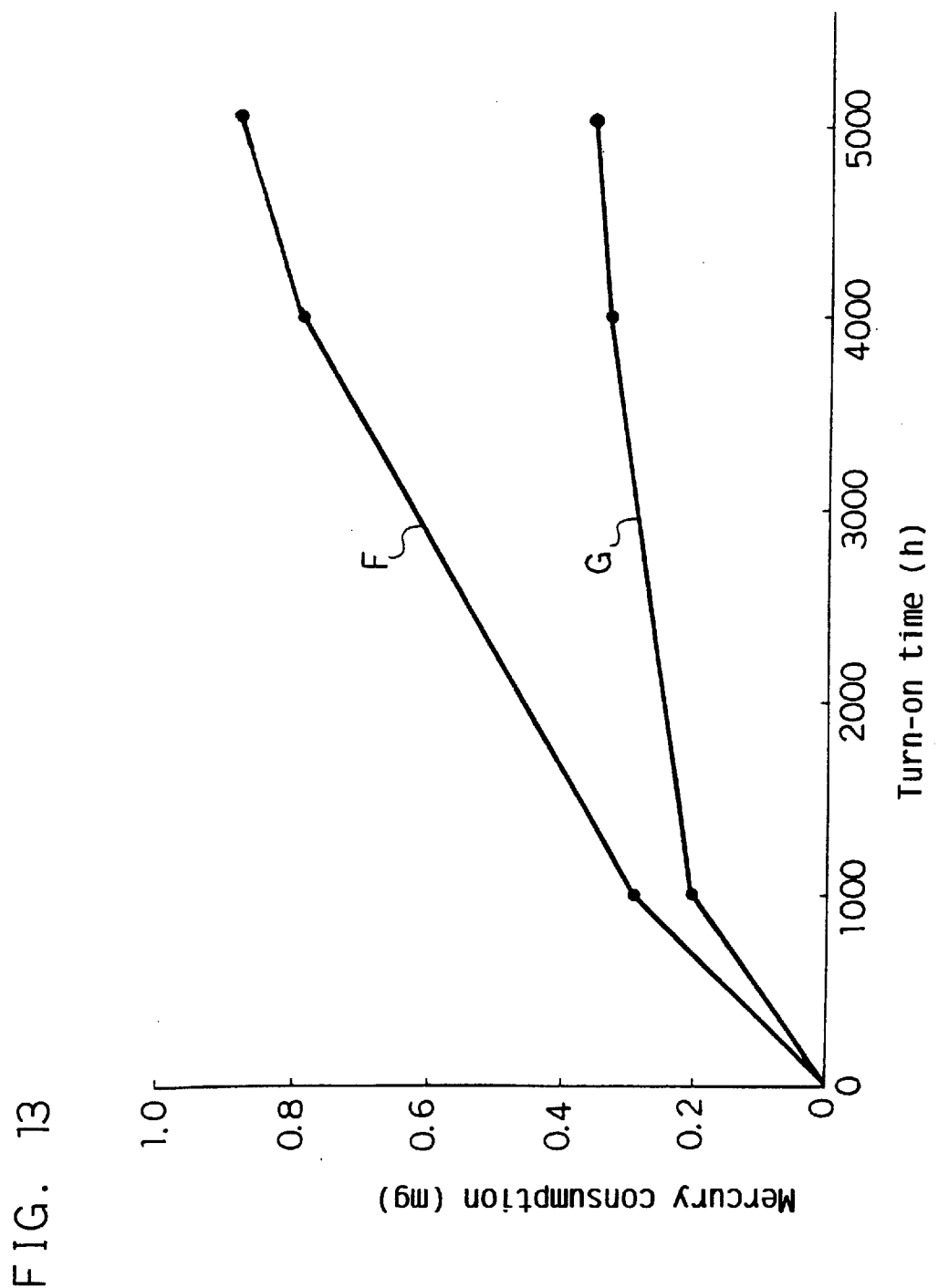
FIG. 13 is a diagram showing the relationship between mercury consumption and turn-on time of a fluorescent lamp according to the present invention and a conventional fluorescent lamp.
Figure 15:
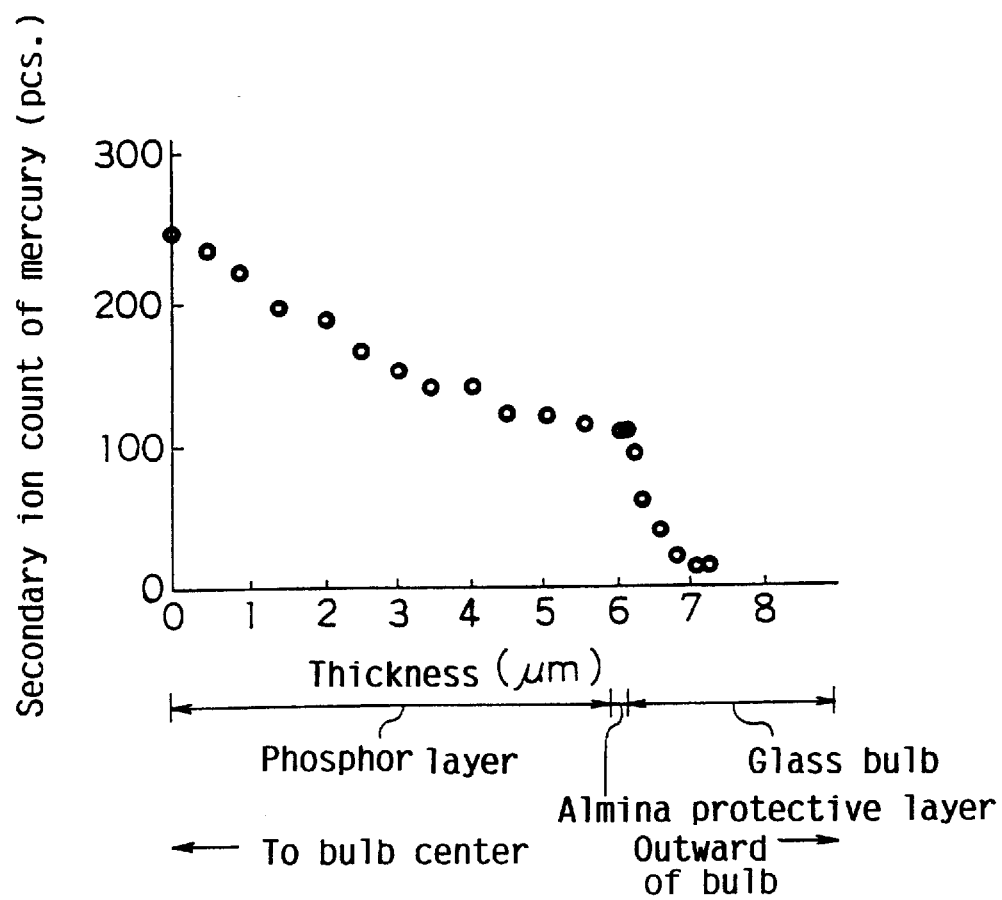
FIG. 15 is the diagram showing the amount of mercury diffusion in a conventional fluorescent lamp (40 W).

Now, the consumption amount of mercury sealed in the fluorescent lamp will be described. In order to measure the mercury consumption in the fluorescent lamp, the Cataphoresis analysis (H. Tomioka, T. Higashi and K. Iwama, The 7th International Symposium on the Science & Technology of Light Sources (1995), p323) was used which permits non-destructive quantitative analysis of mercury in the fluorescent lamp. FIG. 13 is a graph analyzing the relation between mercury consumption and turn-on time of the fluorescent lamp.

A 20 W fluorescent lamp of linear bulb type (FL20SS·EX-N/18) sealed with 3.0 mg of mercury was used for this analysis. In FIG. 13, curve F represents the mercury consumption of a fluorescent lamp simply with a phosphor layer, and curve G the mercury consumption of a fluorescent lamp having yttrium oxide as a metal oxide.

As apparent from the graph of FIG. 13, the fluorescent lamp having a metal oxide consumes less mercury as compared with the fluorescent lamp simply with a phosphor layer. It is understood from the graph of FIG. 13 that a fluorescent lamp having a metal oxide can reduce the amount of mercury consumption by about 65% as compared with the fluorescent lamp simply with a phosphor layer as of the turn-on time of 5000 hours.

Now, a method for manufacturing a fluorescent lamp according to the present invention will be explained with reference to a flowchart shown in FIG. 14.

Step 1 mixes phosphors, or a three-band phosphor material, for example. This phosphor is applied on the inner surface of the glass bulb 2 and dried thereby to form a phosphor layer (step 2). After that, step 3 applies by solving metal alkoxide such as yttrium isopropoxide, and dried at about 100° C. for about 15 minutes, while subjecting the metal alkoxide to hydrolysis. The alcohol, which is generated with the progress of polymerization reaction of metal alkoxide, is removed by vaporization.

Step 4 heat treats the phosphor layer appropriately (about 500° C., about two minutes) in the sinter furnace and thus forms the mixed layer 3, the first thin film 4 and the second thin film 5.

The fluorescent lamp according to this embodiment is fabricated through the normal manufacturing processes for fluorescent lamps comprising the following steps: Step 5 for exhausting the glass bulb 2, step 6 for sealing rare gas and mercury in the glass bulb 2, and step 7 for enclosing the glass bulb.

In the above-mentioned manufacturing method, a metal compound is coated after the phosphor layer is formed by phosphor. The method for manufacturing the fluorescent lamp according to the present invention, however, is not confined to the foregoing method. Specifically, the mixed layer 3 can be formed on the inner surface of the glass bulb 2 by mixing the metal compound and the phosphor in advance. In the case where the metal compound and the phosphor are mixed in advance to form a mixed layer, however, it is necessary to modify the setting of drying time and temperature at step 1.

The metal compound of metal alkoxide according to the embodiment forms a strong film member by using a metal alkoxide in which the molecular structure of the film and the like made of a metal compound is not an oxide with a low molecular structure (MOx) but an oxide of highly polymeric structure (M—O—M—O— . . . ). Examples of such highly polymeric structures formed as a continuous metal oxide are found in the following examples.

Next, a metal oxide film including yttrium isopropopoxide with a metal element of yttrium (Y) will be explained as an example of a metal oxide film. The process in which the metal oxide formed between the phosphor grains is generated is described below based on the flow of chemical reaction of the metal alkoxide.

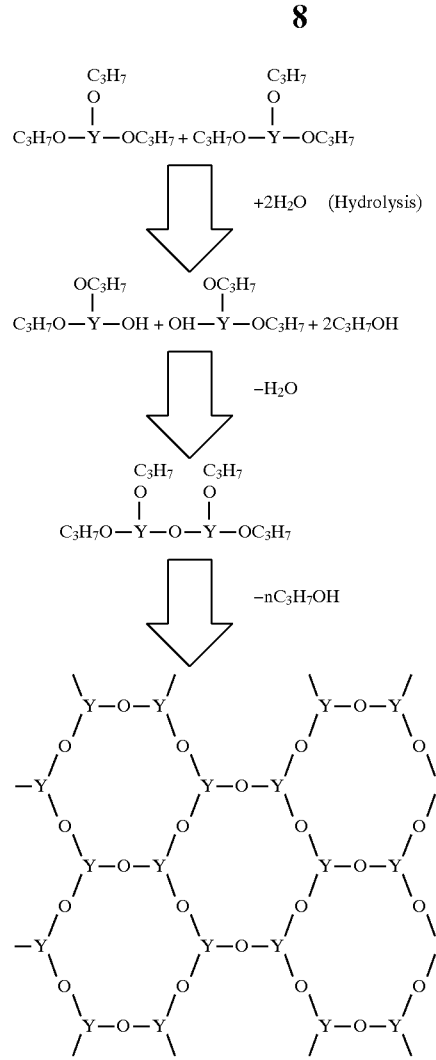

The isopropyl group (—OC$_3$H$_7$) of yttrium isopropopoxide is replaced with the hydroxyl group (—OH) by hydrolysis, thereby generating propanol. This yttrium compound is further dehydrated and polymerized. This reaction is repeated, and annealing at about 500° C. produces a continuous metal oxide in the form of yttrium oxide (Y$_2$O$_3$).

In the manufacturing method according to the present invention, a film or the like of a continuous metal oxide in the form of yttrium oxide (Y$_2$O$_3$) is formed also by starting with an organic metal compound represented by the alkyl group. The general chemical reaction is shown below.

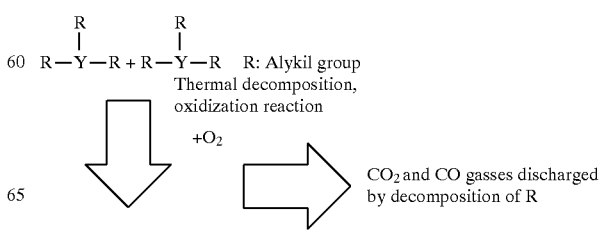

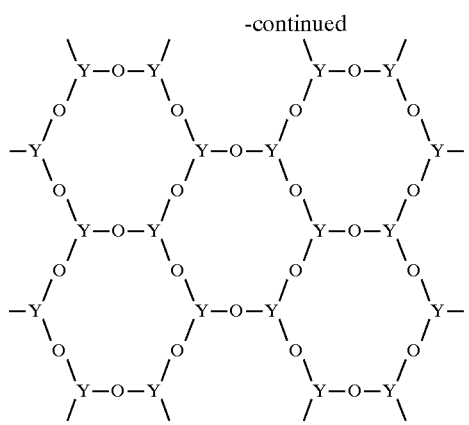

Next, tetraethyoxysilane (TEOS) with a metal element of silicon (Si) will be explained as another example of metal oxide film. The process for generating a metal oxide between the phosphor grains is shown below based on the flow of chemical reaction of metal alkoxide.

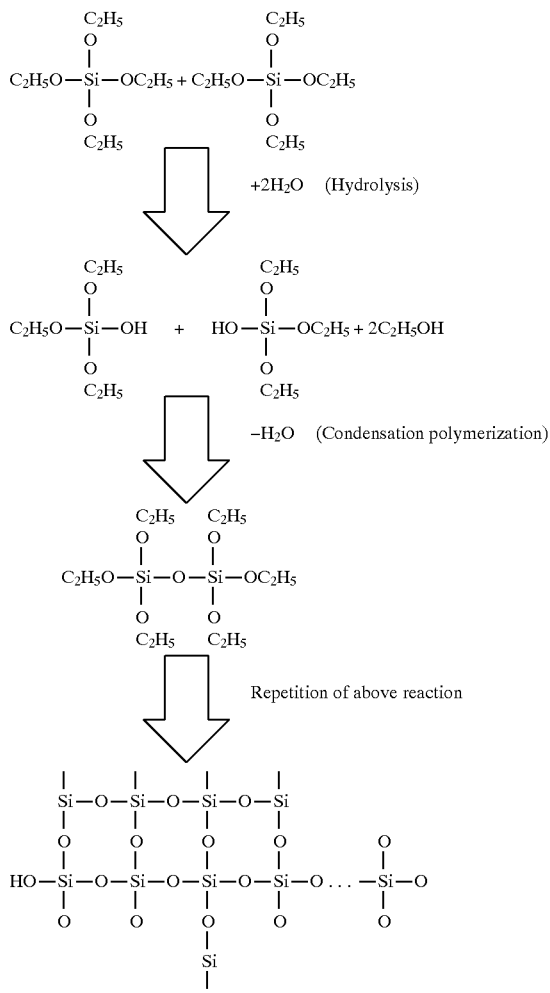

The ethoxy group (—OC$_2$H$_5$) of tetraethoxysilane is replaced with the hydroxyl group (—OH) by hydrolysis, so that TEOS transforms to silanol, thereby generating ethanol. Sylanol is further dehydrated and polymerized. This process is repeated, and subsequent annealing at about 500° C. forms a strong SiO$_2$ film or the like of metal oxide.

Further, the method of manufacturing a fluorescent lamp according to the present invention may use an inorganic metal compound or an organic metal compound including metal nitrate, metal sulfate, metal carbonate or metal β-diketonate complex as an initial material for forming a metal compound. In the case where such a metal compound is used, it was confirmed that an organic metal compound is oxidized by thermal decomposition reaction without the process of hydrolysis reaction and a film or the like similar to the above-mentioned metal oxide is produced as a final product.

For any one of the inorganic or organic compounds described above, it is preferable to anneal them at a temperature ranging from 300° to 800° C. in order to produce a film or the like through the thermal decomposition and oxidization processes. This temperature range was confirmed positively by differential thermal analysis.

Apart from the above-mentioned embodiment wherein the fluorescent lamp has at least a pair of electrodes in the lamp casing, a modified embodiment may be such that the fluorescent lamp is embodied to have no electrode in a lamp casing.

Also, the fluorescent lamp according to the present invention can use the following metal oxides other than yttrium oxide and silicon dioxide: the simple substance of aluminum oxide, hafnium oxide, zirconium oxide, vanadium oxide or niobium oxide, or a combination of two or more selected from the foregoing elements. In this case also, the present invention can be embodied in a manner similar to the case when yttrium oxide or silicon dioxide is used as in the above-mentioned case.

With the fluorescent lamp according to the present invention, the mixed layer may be formed by adding an antioxidant may be added to the metal alkoxide solution. In this way, oxidization of mercury can be prevented thereby to suppress the generation of mercury oxide in the fluorescent lamp.

Further, the fluorescent lamp according to the present invention is such that the mixed layer may be formed by adding phosphorus or boron as impurities to the metal alkoxide solution. Movement of sodium from the glass bulb can thus be inhibited, thereby positively suppressing the reaction between sodium and mercury.

Apart from the above-mentioned embodiment wherein the metal alkoxide solution is used in the method for manufacturing the fluorescent lamp, a modified embodiment may be such that selected one of metal nitrate, metal sulfate, metal carbonate and metal β-diketonate complex is used instead of said metal alkoxide solution, and an antioxidant and impurities, such as phosphorus or boron are added to the above-mentioned selected material.

The art of the invention can be applied not only to the normal start fluorescent lamp but also to the starterless fluorescent lamp having a conductive film with equal effect.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A fluorescent lamp, wherein a mixed layer of phosphors and a metal oxide is formed on an inner surface of a lamp casing sealing mercury therein, said mixed layer having couplings of a metal oxide formed in spaces between grains of said phosphor, and the grains of said phosphor are continuously crosslinked by said couplings and said couplings have a highly polymeric structure.

2. A fluorescent lamp, wherein a mixed layer of phosphor and a metal oxide is formed on an inner surface of a lamp casing sealing mercury therein, said mixed layer having couplings of a metal oxide formed in spaces between grains of said phosphor, the grains of said phosphor are continuously crosslinked by said couplings and said couplings have a highly polymeric structure, and a first thin film of a continuous metal oxide having a highly polymeric structure is formed between the inner surface of said lamp casing and said mixed layer.

3. A fluorescent lamp, wherein a mixed layer of a phosphor and a metal oxide is formed on an inner surface of a lamp casing sealing mercury therein, said mixed layer having couplings of a metal oxide formed in spaces between grains of said phosphor, the grains of said phosphor are continuously crosslinked by said couplings and said couplings have a highly polymeric structure, and a second thin film of a continuous metal oxide having a highly polymeric structure is formed on the inner surface of said mixed layer nearer to a bulb center of said lamp casing.

4. A fluorescent lamp, wherein a mixed layer of a phosphor and a metal oxide is formed on an inner surface of a lamp casing sealing mercury therein, said mixed layer having couplings of a metal oxide formed in spaces between grains of said phosphor, the grains of said phosphor are continuously crosslinked by said couplings and said couplings have a highly polymeric structure, a first thin film of a continuous metal oxide having a highly polymeric structure is formed between the inner surface of said lamp casing and said mixed layer, and a second thin film of a continuous metal oxide having a highly polymeric structure is formed on the inner surface of said mixed layer nearer to a bulb center of said lamp casing.

5. A fluorescent lamp according to claim 1, wherein said metal oxide includes a material for transmitting light having the wavelength of 254 nm.

6. A fluorescent lamp according to claim 1, wherein said metal oxide includes at least one selected from the group consisting of silicon dioxide, aluminum oxide, hafnium oxide, zirconium oxide, vanadium oxide, niobium oxide, and yttrium oxide.

7. A fluorescent lamp according to claim 1, wherein said metal oxide includes a material for cutting off at least 50% of light having the wavelength of about 185 nm.

8. A fluorescent lamp according to claim 1, wherein said mixed layer includes an antioxidant.

9. A fluorescent lamp according to claim 1, wherein said mixed layer includes an impurity selected from the group consisting of phosphorus, and boron.

* * * * *